July 29, 1969    R. N. COWAN    3,458,150
UNIVERSAL EXPANDABLE WINDING MANDREL
Filed Sept. 8, 1967    2 Sheets-Sheet 1
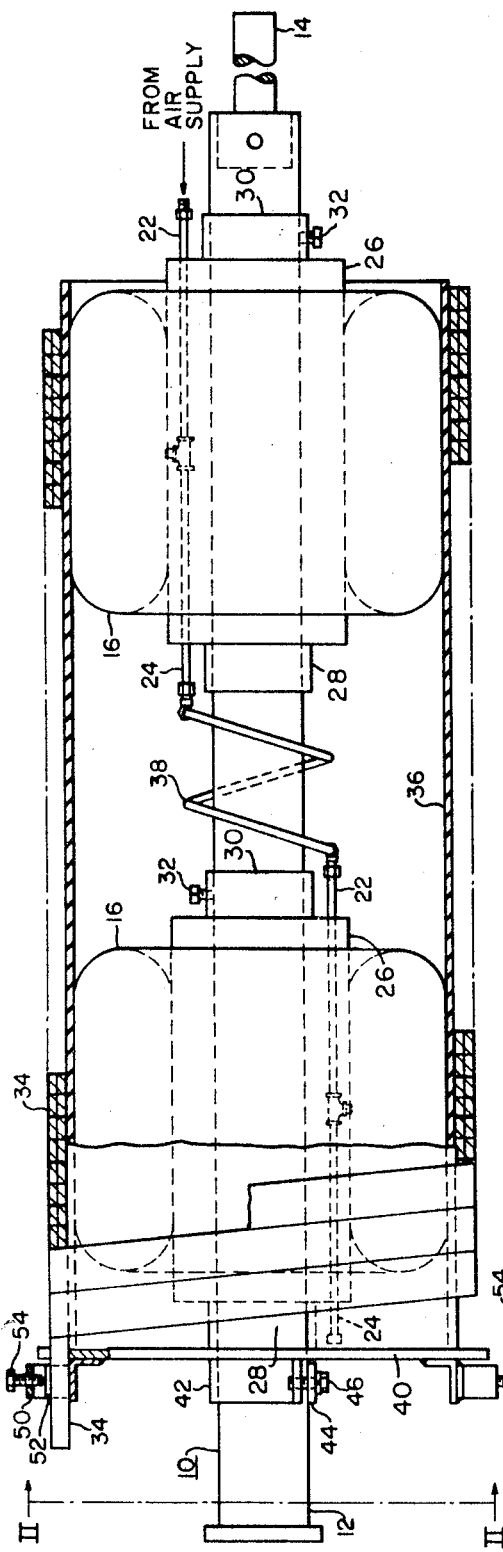
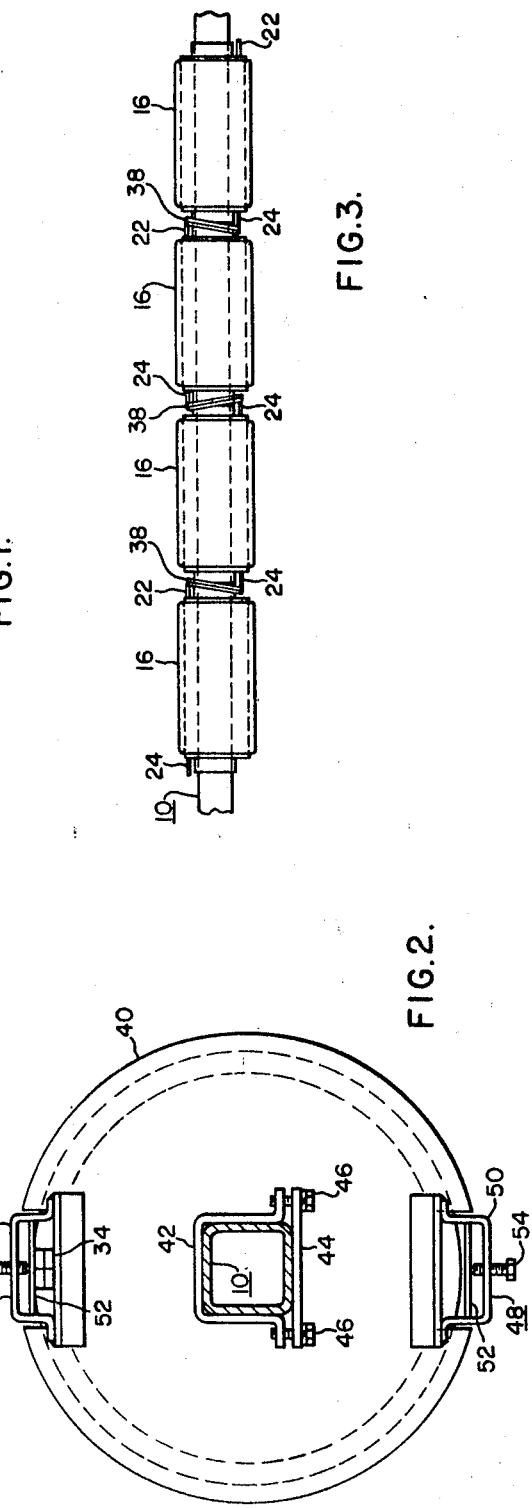

United States Patent Office 3,458,150
Patented July 29, 1969

3,458,150
UNIVERSAL EXPANDABLE WINDING MANDREL
Robert N. Cowan, Grove City, Pa., assignor to Westinghouse Electric Corporation, Pittsburgh, Pa., a corporation of Pennsylvania
Filed Sept. 8, 1967, Ser. No. 666,384
Int. Cl. B65h 75/18
U.S. Cl. 242—72                                           4 Claims

ABSTRACT OF THE DISCLOSURE

A universal expandable mandrel for winding electrical coils comprising a plurality of pneumatically inflatable rubber cells adjustably mounted on a common shaft. The cells expand when inflated to properly support a coil during winding and handling of the coil. Torque is applied to the shaft for turning the coils during winding, and the torque is transmitted from the shaft to the coil by the inflated cells.

BACKGROUND OF THE INVENTION

Field of the invention

This invention relates to universal expandable mandrels for winding electrical coils, and more particularly to an expandable mandrel for winding coils for electrical transformer apparatus, and the like.

Description of the prior art

Wooden mandrels have been used for supporting coil forms in the winding of coils in the past. The use of wooden mandrels for supporting coil forms for winding electrical coils thereon is objectionable for several reasons. The main objection to the use of wooden mandrels is that a separate mandrel is required for each coil size. Since the mandrels must be carefully manufactured to fit the coil forms with those tolerance this method becomes expensive. Not only is a different size wooden mandrel required for each size coil, but the wooden mandrels are sometimes broken during removal from the coil or during handling and storage.

Metal expandable mandrels have also been used. These metal mandrels usually comprise a plurality of narrow slats which are expanded by means of a gear arrangement. These mandrels are expensive to manufacture and the limit of expansion is usually small which places severe restrictions upon the number of sizes of coils which can be wound on any particular mandrel. A further objection to this type of mandrel is that in winding a high voltage power coil where the strands of conductor are wound under substantial tension the metal slats tend to rupture or otherwise damage the pressboard coil form on which the coil is wound. The metallic slat type expandable mandrel is also very expensive to manufacture.

SUMMARY OF THE INVENTION

This invention provides a universal expandable mandrel which may be used for winding many different sizes of coils on the same mandrel. This is accomplished by providing a common shaft having pneumatically inflatable rubber cells movably mounted on the shaft. With this invention different sizes and different lengths of coils may be wound on the same shaft by placing as many of the pneumatically inflatable rubber cells as required on the shaft to provide support for the entire coil form. The torque for winding the coil is applied to the shaft on which the coil form and pneumatically inflatable rubber cells are mounted and the torque is transmitted to the coil form for winding the coil through the pneumatically inflatable cells. The cells are inflated with air pressure until the entire length of the coil form is firmly supported by the mandrel. This type of mandrel is universal and may be used to wind coils of many different diameters in many different lengths on the same mandrel. This mandrel overcomes the objection to the prior art wooden mandrels and the prior art metal slat mandrels which are expensive to manufacture and not adaptable to winding coils of many different diameters and lengths.

BRIEF DESCRIPTION OF THE DRAWINGS

FIGURE 1 is a side view, partially in section, of a mandrel comprising two pneumatically inflatable cells as provided by this invention;

FIG. 2 is an end view of the mandrel of FIGURE 1 taken along line II—II of FIG. 1;

FIG. 3 is a side view of a mandrel utilizing four pneumatically inflatable cells as provided by this invention;

DESCRIPTION OF THE PREFERRED EMBODIMENTS

Figure 4:
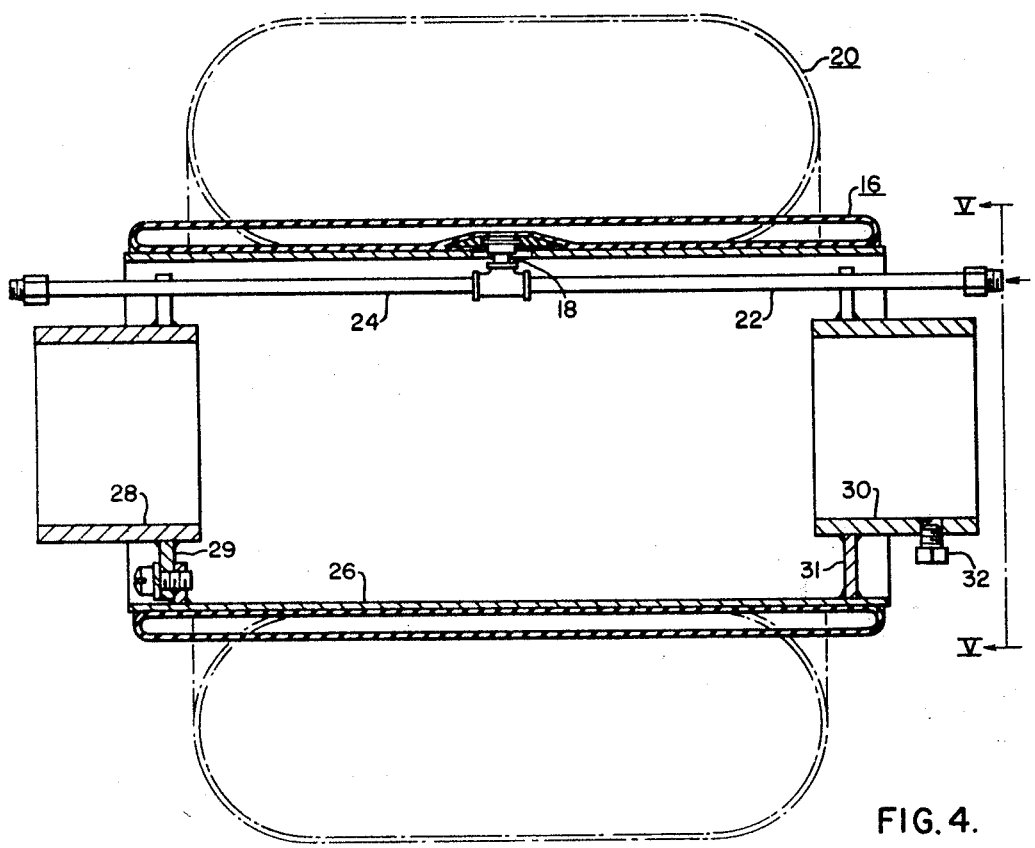
FIG. 4 is a sectional view of one of the individual pneumatically inflatable cells used on the mandrel provided by this invention.
Figure 5:
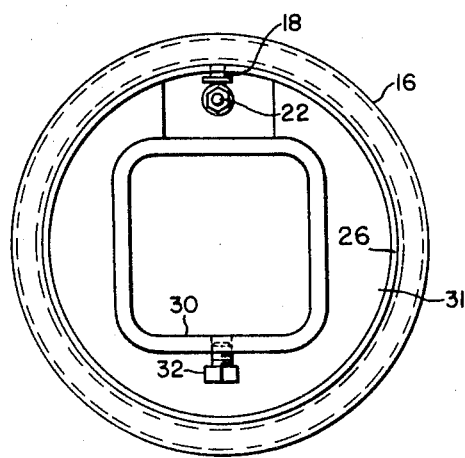
FIG. 5 is an end view of the cells shown in FIG. 4, taken along the line V—V of FIG. 4.

Throughout the description identical reference characters represent the same elements on the various figures of the drawings.

Referring to the drawings in detail, FIGURE 1 illustrates one embodiment of a universal mandrel provided by this invention for winding generally circular electrical coils of different sizes.

The mandrel of FIG. 1 comprises a shaft 10. The end 12 of the shaft 10 is mounted in the head stock of a winding lathe (not shown) for turning the shaft 10 and the end 14 of the shaft 10 is mounted in the tail stock of the winding lathe for supporting the shaft in a substantially horizontal position during the winding operation. The shaft 10 may be square or hexagonal in cross-section, or it may be a keyed circular shaft.

A pneumatically inflatable cell 16 is mounted on the shaft 10. The cell 16 is made from neoprene coated nylon. FIG. 4 illustrates the pneumatically inflatable cell 16 in detail. The cell comprises a neoprene coated nylon member having an inlet 18 for inflating the cell 16. In FIG. 4 the dotted lines 20 indicate the position taken by the cell 16 when inflated. The cell 16 is inflated by applying air or other inflatable medium to the interior of the cell through the tubing 22 which is equipped with a quick shutoff valve, not shown. The cell 16 is also equipped with another tubing 24 which is also equipped with a quick cutoff valve, not shown. The purpose of the tubing 24 is to permit the connection of the cell 16 in series with other cells so that all of the cells may be inflated from a common source. The cell 16 is mounted on a cylindrical metallic member 26 which provides support for the cell when it is inflated. A pair of hollow bracket members 28 and 30 are attached to the cell support member 26 by brackets 29 and 31 and the interior of these hollow members 28 and 30 have the same shape as the cross-section of the shaft 10 to permit the cells to be mounted on the shaft 10 and turned with the shaft 10 when torque is applied to the shaft 10. Lock screws 32 are provided for locking the cells 16 in the desired position on the shaft 10.

Referring again to FIG. 1 which shows the mandrel provided by this invention with an electrical coil 34 being wound thereon. The assembled mandrel comprises the shaft 10 having as many cells 16 as required mounted thereon and locked in position by tightening the lock screws 32. A coil form 36 is placed on the shaft and over the cells 16. The cells 16 are inflated and bear against the coil form 36 and provides the only means for transmitting torque from the shaft 10 to the coil form 36 to turn the coil from 36 to wind the turns of the coil 34 thereon. In practice the cells 16 are inflated to a pressure of from 20 lbs./square inch to 60 lbs./square inch depending upon the size of the coil 34 to be wound. As many cells 16 as required to provide proper support of the coil form 36 may be mounted on the shaft 10. In some instances one or two cells 16 may be all that is required depending upon the size of the coil being wound and the tension under which the turns of the coil are wound on the coil form 36. As seen from FIG. 1 the cells 16 are connected in series by means of a flexible hose 38. This flexible hose 38 permits the cells to be positioned lengthwise on the shaft 10 and also permits the cells to all be inflated in series from a source of air supply.

Also mounted on the shaft 10 is a backup plate 40 for backing up the turns of the coil 34 at the start or stop end of the coil 34. This backup plate is attached to the shaft 10 by means of a bracket 42, a bar 44 and bolts 46. The backup plate 40 also has mounted thereon, 180° apart, a pair of clamps 48. The clamps 48 comprise a U-shaped member 50 and a movable bar 52, and a screw 54 for moving the bar 52. The function of the clamps 48 is to clamp the ends of the coil 34 at the start end of the winding. If desired a similar backup plate having clamps 48 may be provided on the shaft 10 at the other end of the coil.

From FIG. 1 it is seen that the mandrel comprising a number of inflatable cells 16 may be provided to give any desired degree of support for the coil form 36. It has also been found that with the mandrel illustrated in FIG. 1 many different sizes of coils may be wound using the same size cells 16. It has been found that cells having a deflated outside diameter of 7¾ inches may be inflated to a maximum of 15 inches in diameter and used for winding coils up to 15 inches in diameter. It was also found that a cell having a deflated outside diameter of 14 inches could be inflated to maximum outside diameter of 28 inches for winding coils up to 28 inches in diameter. The cells will provide adequate support for the coil forms 36 and positive drive for the coil form 36 when inflated with air from 20 to 60 lbs. per square inch with the cells connected in series or individually.

FIG. 3 shows another embodiment of the mandrel provided by this invention and illustrates how any desired number of cells 16 may be mounted on a shaft 10 to provide the desired support for a coil form. In FIG. 3, there is illustrated four cells 16 closely spaced together which when inflated will provide substantially complete support for a coil form 36 placed on the shaft 10 for winding a coil thereon. In all other respects the mandrel of FIG. 3 is substantially identical to that of FIG. 1.

From the foregoing description taken in connection with the drawings it is seen that this invention has provided an expandable mandrel which is very efficient in providing support for a coil form and in transmitting torque from the driving shaft to the coil form for winding a coil on the coil form. It is also seen that the mandrel provides a very universal and easily adaptable mandrel for winding coils of many different diameters and lengths. The mandrel permits the winding of a wide range of coils using a single size cell and also permits the replaecement of the cells with different cells of another size to provide for winding another wide range of coils using the same drive shaft. It is seen that with an adequate number of cells 16 of different sizes the range of coils which may be wound using the same drive shaft 10 would become practically unlimited. This is an important advantage of this mandrel since it cuts down on the number of mandrels required to wind many different sizes of coils and therefore cuts down the expense of capital equipment required to wind a large number of coils of different sizes.

Another important feature of this invention is the air tight cell 16 with means connected to the interior of the cell and independently of the shaft 10 for inflating the cell 16. This feature permits addition or removal of cells 16 from the shaft without requiring any modification of the shaft 10.

I claim:

1. A mandrel adapted to be rotated for winding thereon turns of electrical conductor to provide electrical coils, said mandrel comprising a shaft, at least one pneumatically inflatable cell mounted on said shaft, said cell being adjustable lengthwise of said shaft to support coils of different lengths, said cell being inflatable to different diameters to support coils of different diameters during winding.

2. The mandrel of claim 1 wherein a plurality of cells are provided on said shaft.

3. The mandrel of claim 2 wherein said plurality of cells are connected in series with a flexible hose to permit adjustment of said cells relative to each other lengthwise of the shaft.

4. The mandrel of claim 2 wherein a backup plate is adjustably mounted on said shaft, said backup plate comprising means for clamping ends of the turns of the conductor of the coils.

References Cited

UNITED STATES PATENTS 2,289,453   7/1942   Randall.

NATHAN L. MINTZ, Primary Examiner